UNITED STATES PATENT OFFICE.

JOHN HERBERT THWAITES, OF PETERBOROUGH, ENGLAND.

PROCESS FOR PRODUCING ZINC PIGMENTS FROM LIQUORS OBTAINED FROM PYRITES OR PYRITES-CINDER AND THE LIKE.

975,907.     Specification of Letters Patent.     Patented Nov. 15, 1910.

No Drawing.     Application filed July 3, 1908. Serial No. 442,519.

*To all whom it may concern:*

Be it known that I, JOHN HERBERT THWAITES, a subject of the King of Great Britain, residing at Market Chambers, Peterborough, in the county of Northampton, England, chemical engineer, have invented certain new and useful Improvements in Processes for Producing Zinc Pigments from Liquors Obtained from Pyrites or Pyrites-Cinder and the Like, of which the following is a specification.

This invention relates to improvements in the process for producing zinc pigments from liquors obtained from pyrites, or pyrites cinder by weathering or leaching, or from pyrites cinder or other roasted copper ore by a further roasting with common salt or other material and leaching.

The object of the invention is to recover from such liquors a white zinc sulfid pigment.

If the liquor contains sufficient copper to pay for the extraction it may be treated by any known method for the purpose, but the presence of a small quantity of copper in the liquor is practically of no consequence to the treatment according to the invention, which is as follows:—Zinc oxid whether hydrated or carbonated or not, is added in any suitable form to the liquor which is heated nearly to, or best right to, boiling. The quantity added is to be sufficient to precipitate all the iron as determined either from the analysis of the liquor or by a trial on a sample of the liquor. If the iron or any of it is in the ferrous state it must be oxidized by air or other suitable oxidant. When there is much ferrous iron it is economical to add the zinc carbonate or oxid in successive portions, oxidizing more or less completely after each addition and then removing the precipitate, whether it contains ferrous iron or not, before the next addition. At the final stage, however, the precipitate must be in a completely oxidized condition in order that no iron may remain in the liquor.

The following chemical equations are typical of the reactions:—

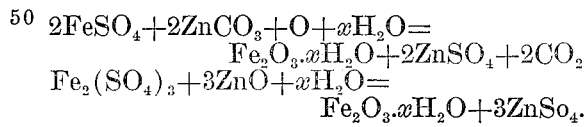

Carbonated zinc oxid is preferable as the precipitant since, when it is used, the settling and washing of the precipitate are somewhat facilitated, but in any case the precipitate, which consists of hydrated oxids of iron and aluminum, sometimes containing basic iron compounds and copper and lead oxids if these metals have not been already removed, is much more easily handled and washed than when alkalies or alkaline earths are used as the precipitant, this being specially noticeable in the case of aluminum.

After precipitation of the iron and aluminum, the remaining copper, lead, arsenic, antimony and cadmium are removed by adding a small quantity of a suitable sulfid.

After this treatment, the whole or a part of the zinc now left in solution is precipitated as sulfid by fractional precipitation with a soluble sulfid, barium sulfid being preferably used if a sulfate is present, so as to produce the pigment known as lithopone, as represented by the following equations:—

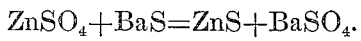

For this purpose the soluble sulfid is added in proportion rather smaller than suffices, as determined by analysis or trial, to precipitate the whole of the zinc present. Local excess is avoided by thorough agitation, and if by chance an excess of the sulfid has been used and the colored precipitate is produced, a reserve portion of the liquor is quickly added to remedy this excess. It is preferable to precipitate the zinc in more than one stage in order to reduce the risk of adding too much of the precipitant.

The white zinc sulfid or lithopone having been separated from the liquor the rest of the zinc, together with the manganese, cobalt and nickel remain in the liquor.

For any particular liquor, after the neutralization of any free acid it may contain, the following data indicate the quantity of the principal reagents to be used.

The quantity of zinc oxid, whether hydrated or carbonated or not, necessary to precipitate the iron, calculated as pure ZnO is slightly more than (1.45 x ferrous iron) (2.18 x ferric iron), a convenient and outside excess being five per cent.

To precipitate nearly the whole of the zinc as sulfid, the quantity of sulfur as sulfid in the soluble sulfid added, is slightly less than (0.56 x ferrous iron) (0.488 x zinc)

(0.85 x ferric iron), a convenient deficiency being three per cent.

If it is desired to obtain the whole of the zinc as lithopone, the total sulfuric anhydrid ($SO_3$) present must not be less than (1.42 x ferrous iron) (1.22 x zinc) (2.14 x ferric iron), and the quantity of barium sulfid to be added, is reckoned as BaS, rather less than 2.1 times that summation, a convenient deficiency being five per cent. If the quantity of $SO_3$ is deficient, it must be made up by the addition of a soluble sulfate such as sodium sulfate. Or the zinc may be obtained partly as sulfid and partly as lithopone.

The following would be a treatment under this invention of one cubic meter of a neutral liquor containing per liter 15 grams of zinc, 18 of iron, in the ferrous state, 0.3 of cobalt, 0.1 of copper and other metals of the same group including arsenic, 5 of common salt, 60 of sulfate of soda ($Na_2SO_4$), 30 grams further of chlorin, 12.3 grams further of sulfuric anhydrid ($SO_3$) and small quantities of lime and magnesia, the temperature being 60° C.: 27 kilo. of zinc oxid, or the equivalent quantity of hydrated or carbonated oxid, is added to the liquor, which is heated to the boiling point, and air is blown in to oxidize the iron while at the same time agitating the whole. The iron precipitate is filtered off, dried, ignited in a furnace and then quenched, yielding about 27 kilo. of red oxid pigments the color and shade of which admits of easy regulation by suitable ignition and quenching in well-known ways. The filtrate from the iron precipitate is thoroughly mixed with either a solution of sodium sulfid containing an amount equal to 0.4 kilo. of the anhydrous compound ($Na_2S$), or a cream containing 0.5 kilo. of zinc sulfid (ZnS); the quantity of water used in each case may conveniently be 3 liters, and if sodium sulfid is used, it should be added gradually in a thin stream. The precipitate produced, which contains the sulfids of copper, arsenic and traces of other metals of the same group, is filtered off, and the filtrate remaining is now ready for the production of lithopone. This liquor contains the zinc originally present, together with that taken into solution during the precipitation of the iron, the total amount being about 35.9 kilo. in the form of 88.6 kilo. of zinc sulfate. To convert the whole of this into lithopone 93.34 kilo. of actual barium sulfid (BaS) would be required; in this case therefore a nearly saturated solution is used containing 92 kilo. of actual BaS or the equivalent, if some $Ba(SH)_2$ is present, and this is added in two portions, the first containing about 85 kilo. BaS or its equivalent, and the second the remainder. The liquor then cold or hot, as preferred, is mixed with the first portion of the BaS solution, which is added gradually and during agitation. The lithopone produced is filtered off, and to the filtrate and washings is similarly added the remainder of the BaS and the second precipitate of lithopone is filtered off, the total amount obtained being about 180.5 kilo. The barium sulfid is added in two separate portions with an intermediate filtration, in order to reduce the risk of accidentally using an excess of it, which would spoil the color of the lithopone.

Having thus described the nature of the said invention and the best means I know of carrying the same into practical effect, I claim:

1. The herein described process of making white zinc sulfid from liquors obtained from pyrites, pyrites cinder and the like, by first adding to the heated liquor a compound of zinc adapted to precipitate iron as hydrated oxid, then oxidizing the mixture, then separating the precipitate thus produced, then adding a sulfid adapted to precipitate copper, lead, arsenic, antimony and cadmium, in proportion sufficient to precipitate these metals only as sulfids, then separating the precipitate thus formed, then adding to the liquor freed from the precipitate a soluble sulfid in proportion insufficient to precipitate the whole of the zinc as sulfid and finally separating the zinc sulfid thus produced.

2. The herein described process of making lithopone from liquors obtained from pyrites, pyrites cinder and the like, by first adding to the heated liquor a compound of zinc adapted to precipitate iron as hydrated oxid, then oxidizing the mixture, then separating the precipitate thus produced, then adding a sulfid adapted to precipitate copper, lead, arsenic, antimony and cadmium, in proportion sufficient to precipitate these metals only as sulfids, then separating the precipitate thus formed, then adding to the liquor freed from the precipitate a barium sulfid in proportion insufficient to precipitate the whole of the zinc as sulfid and finally separating the lithopone thus produced.

In testimony whereof I have signed my name to this specification in the presence of two subscribing witnesses.

JOHN HERBERT THWAITES.

Witnesses:
 GEO. J. B. FRANKLIN,
 WALTER J. SKERTEN.